US009940787B2

(12) United States Patent
Janosov et al.

(10) Patent No.: US 9,940,787 B2
(45) Date of Patent: Apr. 10, 2018

(54) NESTED ONLINE GAMES FOR REAL MONEY GAMBLING

(71) Applicant: Zynga Inc., San Francisco, CA (US)

(72) Inventors: Jesse Janosov, San Francisco, CA (US); Nir Leibovich, Houston, TX (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 14/449,134

(22) Filed: Jul. 31, 2014

(65) Prior Publication Data

US 2015/0038219 A1 Feb. 5, 2015

Related U.S. Application Data

(60) Provisional application No. 61/861,962, filed on Aug. 2, 2013.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |
| ***G07F 17/32*** | (2006.01) |

(52) U.S. Cl.
CPC ...... *G07F 17/3241* (2013.01); *G07F 17/3244* (2013.01)

(58) Field of Classification Search
USPC ................ 463/16, 17, 20, 25, 29, 40, 42, 43
See application file for complete search history.

(56) References Cited

U.S. PATENT DOCUMENTS 7,766,739 B2 * 8/2010 Kane et al. ...................... 463/17
2001/0036623 A1 * 11/2001 Johnson ................... G09B 7/02 434/350
2004/0248652 A1 * 12/2004 Massey ................... A63F 13/12 463/42
2006/0287068 A1 * 12/2006 Walker ................ G07F 17/3237 463/25
2008/0090645 A1 * 4/2008 Walker ................ G07F 17/3237 463/25
2008/0261701 A1 * 10/2008 Lewin et al. ................... 463/43
(Continued)

OTHER PUBLICATIONS

Nick Tylwalk, "Zynga Slots Review", Gamezebo (Jun. 18, 2012).
Joe Osborne, "Zynga Slots on iPhone: Zynga's spin on a tired if necessary game", blog.games.com (Jun. 18, 2012).

*Primary Examiner* — Adetokunbo O Torimiro
(74) *Attorney, Agent, or Firm* — Martine Penilla Group, LLP

(57) ABSTRACT

Software on a server and/or client device verifies a user as eligible to play an online game in which the wager and payout are made with real money. The software causes a graphical user interface (GUI) view for a first online game to be displayed to a user. The software then receives a first game input from the user. The first game input represents a wager or a play according to game mechanics of the first online game. The software causes a GUI view for a second game to be displayed to the user. And the software receives a second game input from the user. The second game input represents a play according to game mechanics for the second game. Then the software provides a payout for the first online game. The payout includes a promotional payout that depends at least in part on the second game input.

8 Claims, 16 Drawing Sheets

(56) References Cited

U.S. PATENT DOCUMENTS

| | | | | |
|---|---|---|---|---|
| 2009/0198596 | A1* | 8/2009 | Dolan | G06Q 10/06<br>705/28 |
| 2010/0165961 | A1* | 7/2010 | Rosario et al. | 370/338 |
| 2010/0216553 | A1* | 8/2010 | Chudley et al. | 463/42 |
| 2011/0223895 | A1* | 9/2011 | Wagda et al. | 455/414.2 |
| 2011/0300917 | A1* | 12/2011 | Hill | 463/11 |

* cited by examiner

Figure 4A
JACKPOT
1,500
255
10
TOTAL BET
10
LAST WIN
90
SPIN
LINES 10
BET 1
MAX LINES
401
402
403
404

Figure 4B
401
405
TERRIFIC!
SPIN
Play Zynga slots on the Retina display iPad!

Figure 7C
JACKS OR BETTER!
YOU WON $100
DEAL
$100
$200
$300
$400
$500

701

NESTED ONLINE GAMES FOR REAL MONEY GAMBLING

RELATED APPLICATION

This application claims the benefit of and/or priority to U.S. Provisional Patent Application No. 61/861,962, also entitled "Nested Online Games for Real Money Gambling", filed on Aug. 2, 2013. The disclosure of that provisional application is incorporated herein by reference for all purposes.

BACKGROUND

Though online gambling for real money allows a user to gamble conveniently from almost any location in a governmental jurisdiction, it lacks the excitement that results from being in the company of other gamblers at the slots or poker tables of a busy casino.

Consequently, websites that provide online gambling for real money are engaged in ongoing research and study into ways to make online gambling more exciting and interesting.

SUMMARY

In an example embodiment, a processor-executed method is described. According to the method, software on a server and/or client device verifies a user as eligible to play an online game in which the wager and payout are made with real money. The software causes a graphical user interface (GUI) view for a first online game to be displayed to a user. The software then receives a first game input from the user. The first game input represents a wager or a play according to game mechanics of the first online game. The software causes a GUI view for a second game to be displayed to the user. And the software receives a second game input from the user. The second game input represents a play according to game mechanics for the second game. Then the software provides a payout for the first online game. The payout includes a promotional payout that depends at least in part on the second game input.

In another example embodiment, an apparatus is described, namely, computer-readable storage media that persistently store a program. The program might be part of software that runs on a server and/or client device. The program verifies a user as eligible to play an online game in which the wager and payout are made with real money. The program causes a graphical user interface (GUI) view for a first online game to be displayed to a user. The program then receives a first game input from the user. The first game input represents a wager or a play according to game mechanics of the first online game. The program causes a GUI view for a second game to be displayed to the user. And the program receives a second game input from the user. The second game input represents a play according to game mechanics for the second game. Then the program provides a payout for the first online game. The payout includes a promotional payout that depends at least in part on the second game input.

Another example embodiment also involves a processor-executed method. According to the method, software on a server and/or client device verifies a user as eligible to play an online game in which the wager and payout are made with real money. The software causes a graphical user interface (GUI) view for the online game to be displayed to a user. The software then receives a first game input from the user. The first game input represents a wager or a play according to game mechanics of the online game. The software causes a GUI view for a minigame to be displayed to the user. And the software receives a second game input from the user. The second game input represents a play according to game mechanics for the minigame. Then the software provides a payout for the online game. The payout includes a promotional payout that depends at least in part on the game input for the minigame.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

Figure 1:
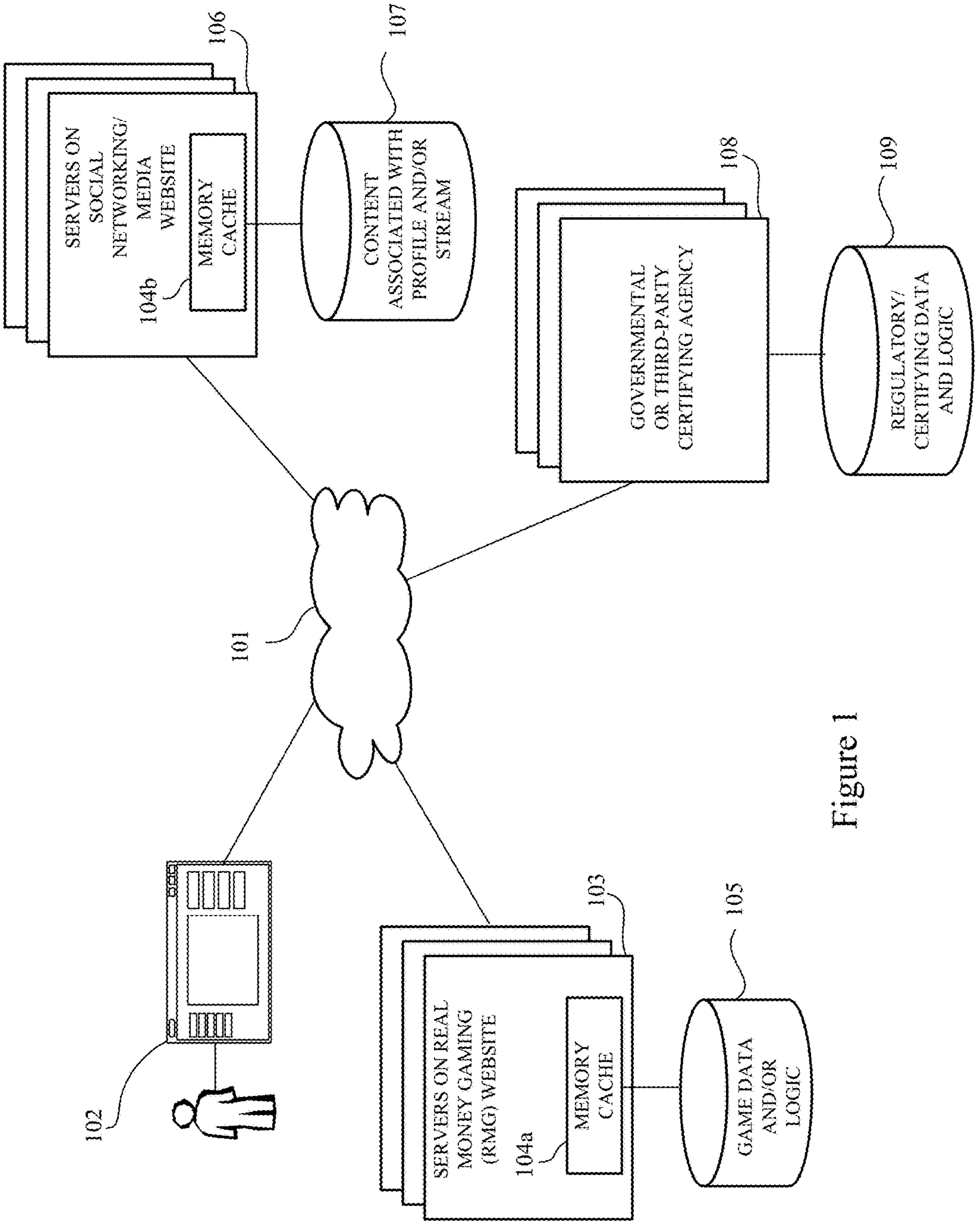
FIG. 1 is a network diagram that illustrates a network for an online game involving real-money gambling (RMG), in accordance with an example embodiment.

FIG. 1 is a network diagram that illustrates a network for an online game involving real-money gambling (RMG), in accordance with an example embodiment. As depicted in this figure, a personal computing device 102 is connected by a network 101 (e.g., a wide area network (WAN) including the Internet, which might be wireless in part or in whole) with a website 103 hosting a real-money gambling game (e.g., a website such as Zynga hosting a video slot machine or other casino game) and a website 106 hosting a social network (e.g., a website such as Facebook) and/or social media (e.g., a website such as Pinterest). As used here and elsewhere in this disclosure, the term "social networking/social media website" is to be broadly interpreted to include, for example, any website that allows its users to, among other things, (a) selectively access (e.g., according to a contact list, buddy list, social graph, or other control list) content in each other's profiles; (b) selectively (e.g., according to a contact list, buddy list, social graph, distribution list, or other control list) broadcast content to each other's content/activity streams; and/or (3) selectively communicate (e.g., according to a contact list, buddy list, social graph, distribution list, or other control list) with each other (e.g., using a messaging protocol such as email, instant messaging, short message service (SMS), etc.). As also depicted in FIG. 1, website 103 might also be connected by network 101 (e.g., through a secure application programming interface (API)) to a website 108 controlled and maintained by a governmental agency or a third-party certifying agency. In example embodiments, website 108 might be associated with (a) a governmental agency (e.g., the Nevada Gaming Control Board, the New Jersey Casino Control Commission, or the Isle of Man Gambling Supervision Commission (IMGSC)) or (b) a third-party certifying agency (e.g., an accounting firm such as one of the "Big Four" auditing firms or a consulting firm such as Cigital, Ltd.). Such a governmental agency or third-party certifying agency might use network 101 to conduct or facilitate an audit of website 103 (e.g., test and certify the website's random number generator (RNG) against standards such as the "Online Gambling (Systems Verification)(No. 2) Regulations 2007" promulgated by the IMGSC). In an alternative embodiment, website 103 might be connected by a dedicated network connection to website 108. The described auditing parties are merely examples, and other auditing commissions, agencies, or entities or combinations thereof might conduct and/or facilitate auditing of website 103. In example embodiments, website 103 might execute software (e.g., client software) that facilitates real-time (or near real-time) reporting to or auditing by website 108.

Also, in an example embodiment, website 108 might be associated with a non-regulatory governmental agency, such as the federal state department or a state department of motor vehicles, which keeps and maintains age-related records such as birth certificates, passports, driver's licenses, identification (ID) cards, social-security numbers, etc. In this example embodiment, website 103 might use network 101 or a dedicated network connection to connect to website 108 to verify that a user of an online RMG game is old enough (e.g., age twenty-one or over) to legally play the online RMG game.

Figure 2A:
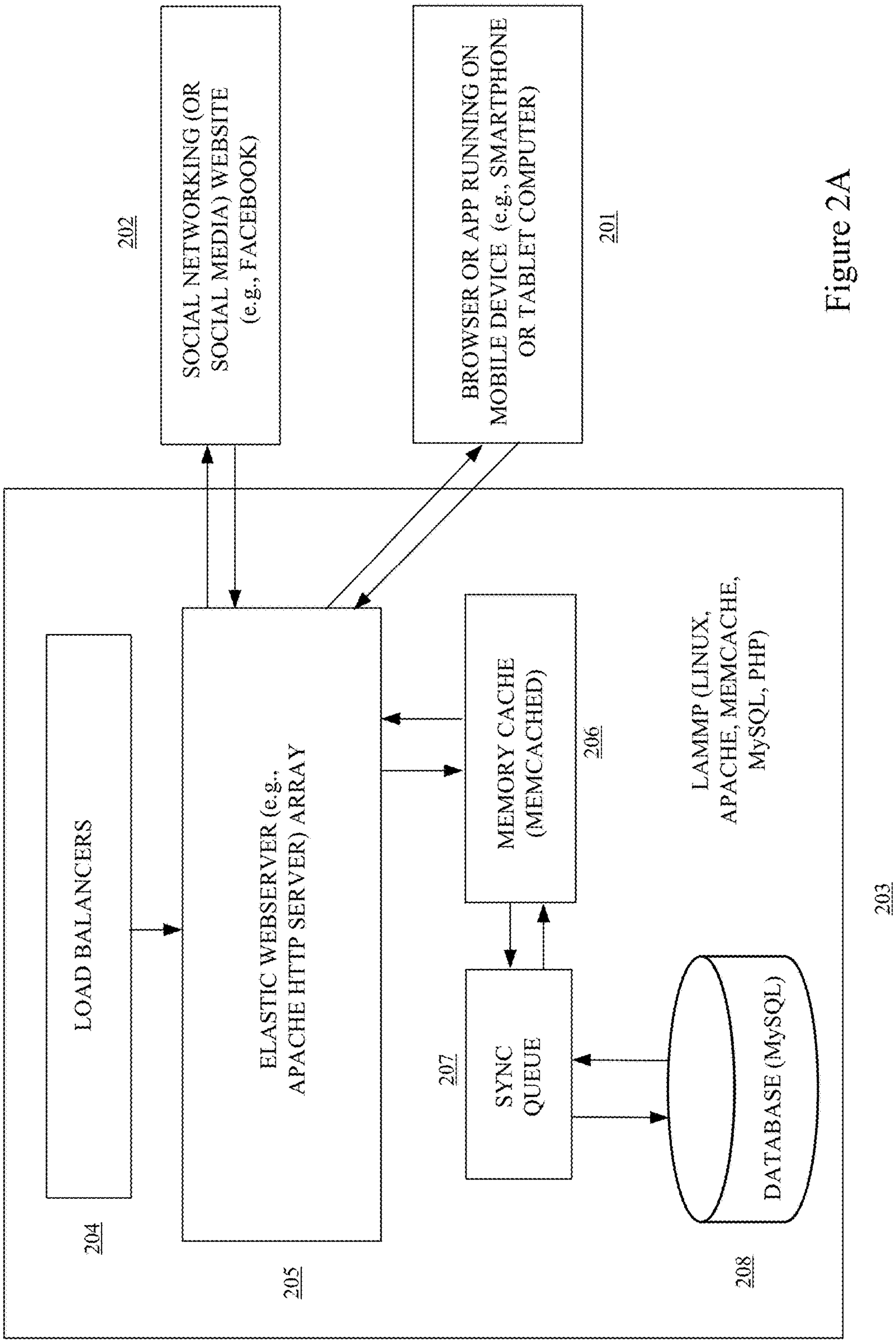
FIG. 2A is a software modularization for a cloud platform, in accordance with an example embodiment.

FIG. 2A is a software modularization for a cloud platform, in accordance with an example embodiment. As depicted in this figure, a player is using a web browser or app 201 on a mobile device (e.g., a smartphone or a tablet computer) to interact with (e.g., transmit or receive game data) server software 203 running on a website hosting an online RMG game (e.g., running on the servers at website 103 in FIG. 1). It will be appreciated that an application program for a mobile device is often referred to as an "app". In an example embodiment, server software 203 might be implemented using a public, private, or hybrid cloud platform, e.g., a hybrid cloud platform whose public cloud is Amazon Electric Compute Cloud (EC2) and whose private cloud is built using Cloud.com's CloudStack software. In an alternative example embodiment, server software 203 might be implemented using other public clouds and/or other private clouds that provide similar functionality. Or, server software 203 might be implemented without resort to third-party cloud platforms, e.g., using (a) OpenStack or (b) load balancing and virtualization software (e.g., Citrix XenServer, VMware, Microsoft, or Xen), distributed computing software (such as Hadoop (which implements Map-Reduce), Dremel/Apache Drill, etc.), distributed memory-caching software (such as memcached), distributed key-value database software (such as Couchbase Server nee Membase Server), NoSQL database-management software, structured database-management software (such as MySQL and NewSQL), etc. It will also be appreciated that SQL is an acronym which stands for Structured Query Language.

Returning to FIG. 2A, server software 203 includes load balancers 204 (e.g., the load balancing and virtualization software provided by Citrix, VMware, Microsoft, or Xen) that balance the load between the servers (e.g., Apache HTTP servers) in an elastic (or dynamic) array 205. It will be appreciated that the array is elastic because its size can be increased to accommodate additional servers and decreased to accommodate fewer servers. As further depicted in FIG. 2A, the servers in the elastic array 205 transmit (e.g., using HTTP) data to and receive data from (a) the web browser or app 201 and/or (b) the servers on a social networking website 202 such as Facebook. In an example embodiment, the servers might read data from and write data to memory cache 206 (e.g., a memory cache created with memcached and managed with Couchbase Server), which, in turn, is backed by database 208, which might be MySQL. In an alternative example embodiment, the database 208 might be NoSQL. It will be appreciated that performance latencies can be significantly reduced by such a caching arrangement, which exploits locality of reference. It will also be appreciated that memory cache 104*a* in FIG. 1 corresponds to the memory cache 206 in FIG. 2 and the persistent storage 105 in FIG. 1 corresponds to the database 208 in FIG. 2A. In an example embodiment, synch queue 207 might receive the data from memory cache 206 to be written asynchronously to the database 208. As indicated on FIG. 2A, the software modularization depicted in the figure might be implemented as a LAMMP (Linux, Apache, Memcache, MySQL, PHP) architecture, in an example embodiment.

Figure 2B:
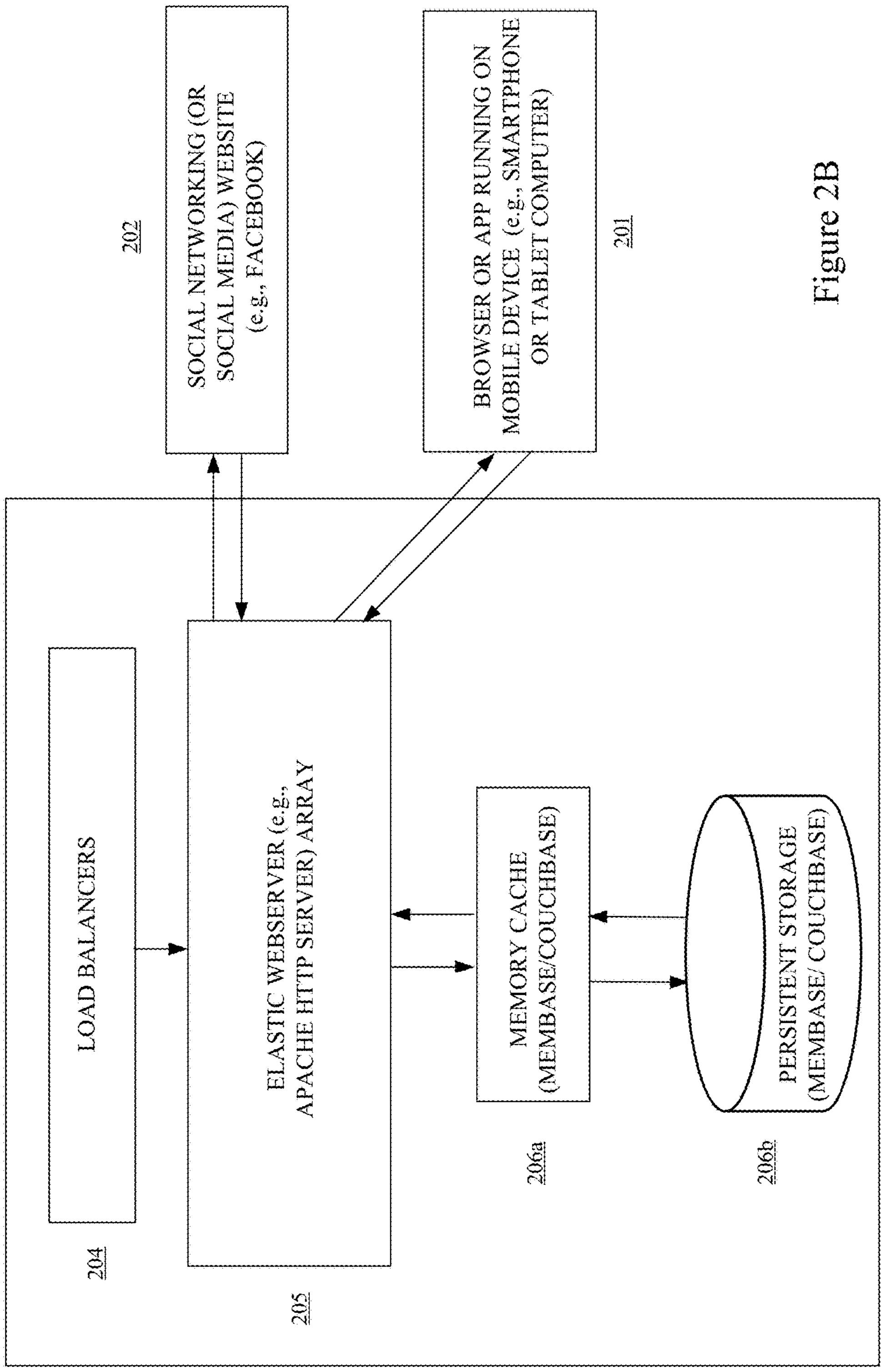
FIG. 2B is an alternative software modularization for a cloud platform, in accordance with an example embodiment.

FIG. 2B is an alternative software modularization for a cloud platform, in accordance with an example embodiment. As depicted in this figure, a player is using a web browser or app 201 on a mobile device (e.g., a smartphone or a tablet computer) to interact with server software 203 running on a website hosting an online RMG game. In an example embodiment, server software 203 might be implemented using a public, private, or hybrid cloud platform. Alternatively, server software 203 might be implemented without resort to third-party cloud platforms, e.g., using load balancing and virtualization software, distributed computing software, distributed memory-caching software, distributed key-value database software, NoSQL database-management software, structured database-management software, etc.

In FIG. 2B, server software 203 includes load balancers 204 that balance the load between the servers in an elastic array 205. As further depicted in this figure, the servers in the elastic array 205 transmit data to and receive data from (a) the web browser or app 201 and/or (b) the servers on a social networking website 202 such as Facebook. In an example embodiment, the servers might read data from and write data to a hybrid in-memory database (e.g., a hybrid in-memory database such as Membase/Couchbase Server) which comprises volatile storage 206*a* and persistent storage 206*b*.

Figure 3:
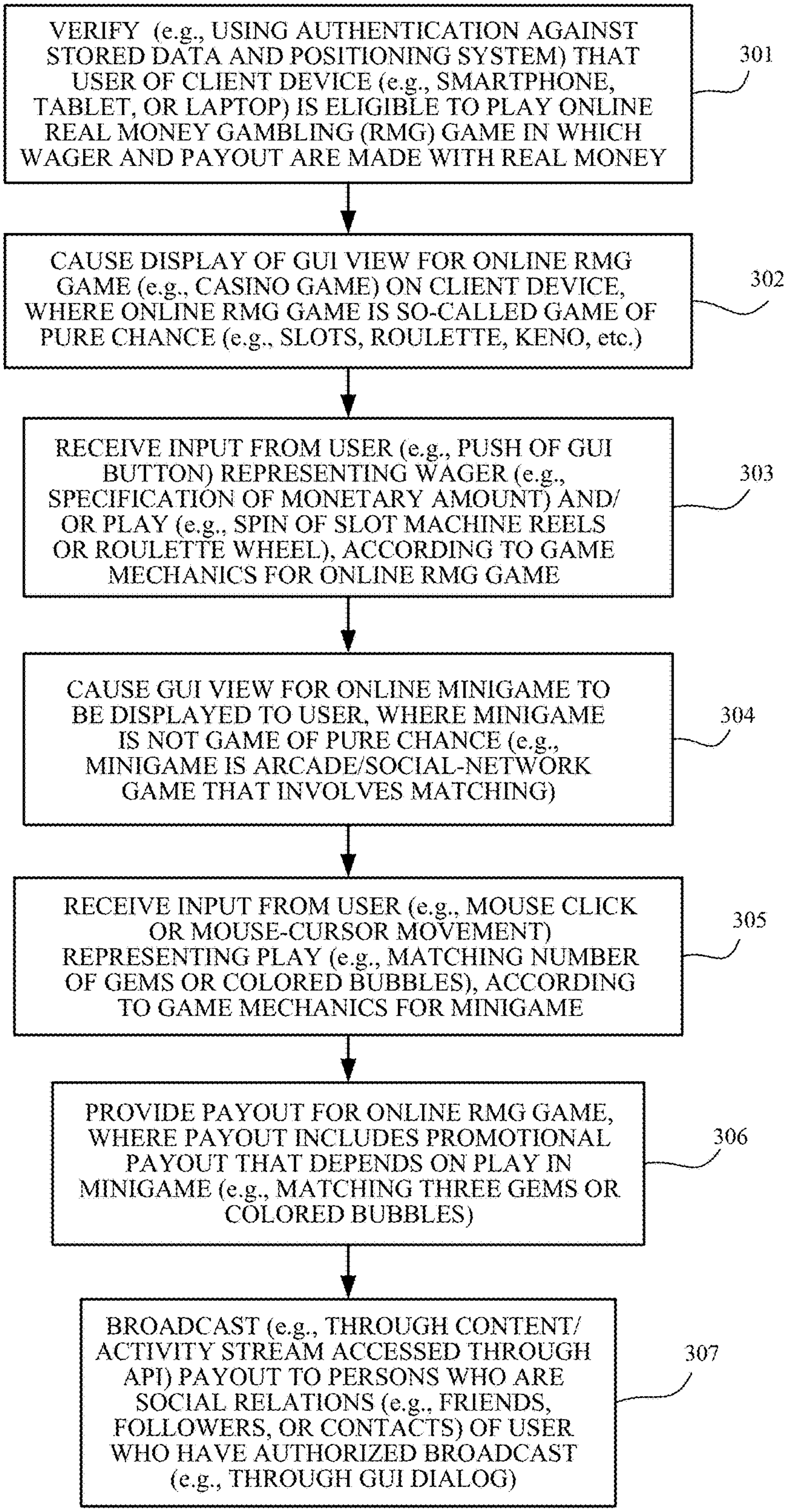
FIG. 3 is a flowchart diagram that illustrates a process for receiving a play and broadcasting a payout in an online RMG game that includes a minigame, in accordance with an example embodiment.

FIG. 3 is a flowchart diagram that illustrates a process for receiving a play and broadcasting a payout in an online RMG game that includes a minigame, in accordance with an example embodiment. In an example embodiment, one or more of the operations in this process might be performed by software (including software 203) running on servers at a website 103, e.g., a website, such as Zynga, hosting an online RMG game. In the same or an alternative embodiment, one or more of the operations in these processes might be performed by software running on personal computing device 102, e.g., (a) instructions in a webpage read by a browser supporting Adobe Shockwave/ActionScript or HTML5/CSS3/JavaScript, or (b) instructions in an app (or in a hybrid app with embedded HTML5) executing on a smartphone. It will be appreciated that ActionScript and JavaScript might be used to implement animation and/or interactivity through a browser, in example embodiments.

The process described in FIG. 3 makes use of the social relations (e.g., friends, followers, contacts, etc.) of a user, according to a contact list, buddy list, social graph, or other control list. It will be appreciated that access to these social relations is controlled by the user. That is to say, the software performing the operations in FIG. 3 (and the other figures) will only have access to these social relations if the user authorizes such access, e.g., through a command entered on a GUI dialog displayed or caused to be displayed by the software. Similarly, in an example embodiment, the software performing the operations in FIG. 3 (and the other figures) might only have access to the profiles and/or content/activity streams of a social relation if authorized by the social relation, e.g., through a command entered on a GUI dialog displayed or caused to be displayed by software at website 103.

As depicted in FIG. 3, software (e.g., running on a server and/or client device) verifies that a user of a client device (e.g., smartphone, tablet, or laptop) is eligible to play an online RMG game in which the wager and the payout are made with real money, in operation 301. In an example embodiment, this operation, which might be performed in conjunction with authentication, includes verifying that the user is old enough to legally play (e.g., age twenty-one or older) using stored data relating to age (e.g., from a birth certificate, passport, driver's licenses, identification (ID) cards, social-security number, etc.) or data relating to age that might be obtained in real time or near real time (e.g., through a web or other API exposed by a governmental agency such as a federal state department or a state department of motor vehicles). Also, in an example embodiment, this operation might include verifying that a user's client device is located within the geographical boundaries of a governmental jurisdiction (e.g., within the state of Nevada or within the city of Atlantic City) using: (a) a global-positioning system (GPS); (b) a WiFi positioning system, which might include an indoor positioning system; (c) multilateration, e.g., using radio towers; (d) data such as "check-ins" retrieved from location-based social media; or (e) a combination (e.g., a hybrid system) of the foregoing. In an example embodiment, this operation might also include verification that the user meets non-governmental conditions relating to eligibility, e.g., that the user is not a problem gambler as determined by data in a user profile stored and maintained by website 103. For example, a user might be identified as a problem gambler if a recent credit report for the user is relatively bad and the user has lost a relatively large amount of money in a relatively short period of time.

In operation 302, the software causes the display of a GUI view for an online RMG game (e.g., casino game) on the client device. In an example embodiment, the online RMG game is a video version of a so-called "game of pure chance" such as slots, roulette, keno (e.g., lottery), etc., that does not depend on strategy or skill (e.g., including skill in estimating the odds of winning given an event or a number of events). In operation 303, the software receives input from the user (e.g., a push of GUI button) representing a wager (e.g., a specification of monetary amount) and/or a play (e.g., a spin of slot machine reels or a spin of a roulette wheel), according to the game mechanics for the online RMG game. In an example embodiment, one wager might be associated with several plays of the online RMG game. Or several wagers might be associated with one play of the online RMG game. Then the software causes a GUI view for a minigame (which might be online, offline, or a combination of the two) to be displayed to the user, in operation 304. For example, the GUI view for the minigame might be displayed following a wager but before receipt of a play in the online RMG game. Or the GUI view for the minigame might be displayed following receipt of play in the online RMG game, but before the determination (e.g., using an RNG) of whether the play results in a payout, according to a paytable for the online RMG game. The GUI view of the minigame might be displayed periodically after a specified number of wagers or plays in the online RMG game. For example, the GUI view of the minigame might be displayed after every other wager or play in the online RMG game or after every five wagers or after every five plays in the online RMG game. Alternatively, the GUI view of the minigame might be displayed after every wager or after every play in the online RMG game.

In an example embodiment, the minigame is not game of pure chance. For example, the minigame might be a video version of an arcade game with social-networking features that involves matching (e.g., a tile-matching or match-3 game) such as Zynga's Ruby Blast or Zynga's Bubble Safari. In an example embodiment, the social-networking features might include allowing a user to invite social relations (e.g., friends, followers, or contacts) to assist with playing the game (e.g., completing a game task) or to join the game. The social-networking features might also include broadcasting a user's points or other achievements (e.g., power levels) from the game to the content/activity streams of social relations who have authorized such broadcasts (e.g., through a GUI dialog). In operation 305, the software receives input from the user (e.g., a mouse click or a mouse-cursor movement) representing a play (e.g., matching a number of gems or a number of colored bubbles), according to the game mechanics for the minigame. The software provides a payout for the online RMG game, in operation 306. Such a payout might occur following a new wager and/or a new play by the user in the online RMG game, in an example embodiment. It will be appreciated that a payout for an online RMG game might be determined by a paytable that is a schedule of payouts for the outcomes that might occur from wagers and plays in the online RMG game. In an example embodiment, the online RMG game might be a video slot machine. It will be appreciated that a paytable for a video slot machine is a table that shows the schedule of payouts for each winning payline, depending on the amount wagered. It will further be appreciated that for a video slot machine, a winning payline might consist of multiple matching reel symbols in a horizontal, oblique, triangular, trapezoidal, zigzag, etc., line, e.g., three matching pieces of fruit (three bananas) in a horizontal line. A video slot machine that is a multi-line game might have multiple winning paylines.

In an example embodiment, the payout in operation 306 might include a promotional payout that depends on a play in minigame (e.g., matching three gems or matching three colored bubbles). The play might be a play received in operation 303. Or the play might be a new play by the user in the online RMG game. In an example embodiment, a promotional payout is a supplemental payout that is not reflected in the paytable for an online RMG game, e.g., a relatively small percentage such as approximately 1-20 percent of the paytable payout. Then in operation 307, the software broadcasts the payout to persons who are social relations (e.g., friends, followers, or contacts) of the user who have authorized the broadcast (e.g., through a GUI dialog). In an example embodiment, such broadcasting might be accomplished through the use of an application programming interface (API), which might be a web API, exposed by software running on a social networking/social media website (e.g., website 106 in FIG. 1). Examples of such APIs include Facebook (REST) API, Facebook Graph API, Twitter API, Bebo's Social Networking API (SNAPI), OpenSocial API, etc. It will be appreciated that the Facebook APIs allow authorized third parties (e.g., third parties with an access token and/or permissions) to access a user's Facebook profile and the content/activity stream (e.g., Facebook News Feed) associated with that profile. Alternatively, the software might broadcast the payout to persons who are social relations using a messaging protocol such as email, instant messaging, SMS, etc. In some example embodiments, the software might not perform the broadcasting operation 307.

Figure 4A:
FIGS. 4A and 4B are views in a graphical user interface (GUI) for a video slot machine, in accordance with an example embodiment.
Figure 4B:

FIGS. 4A and 4B are views in a graphical user interface (GUI) for a video slot machine, in accordance with an example embodiment. As depicted in FIG. 4A, view 401 includes four virtual reels; virtual reel 402 is the leftmost reel. The theme of the video slot machine is "Alice's Adventures in Wonderland". Consequently, the reel symbols include the March Hare, the Mad Hatter, the Caterpillar, the Queen of Hearts, the Cheshire Cat (WILD), a painted-red rose, and the Clubs Suit symbol. It will be appreciated that a wild symbol, like the Cheshire Cat, can substitute for any other symbol to achieve a winning combination. The view 401 also includes a "BET" button 403 which allows the user to set the monetary amount of the wager (e.g., 1) and a "SPIN" button 404 which allows a user to initiate a play. FIG. 4B shows view 401 with a winning payline 405, e.g., a winning payline resulting from two Club Suits symbols and a Cheshire Cat (WILD) symbol next to each other in a horizontal line.

Figure 5A:
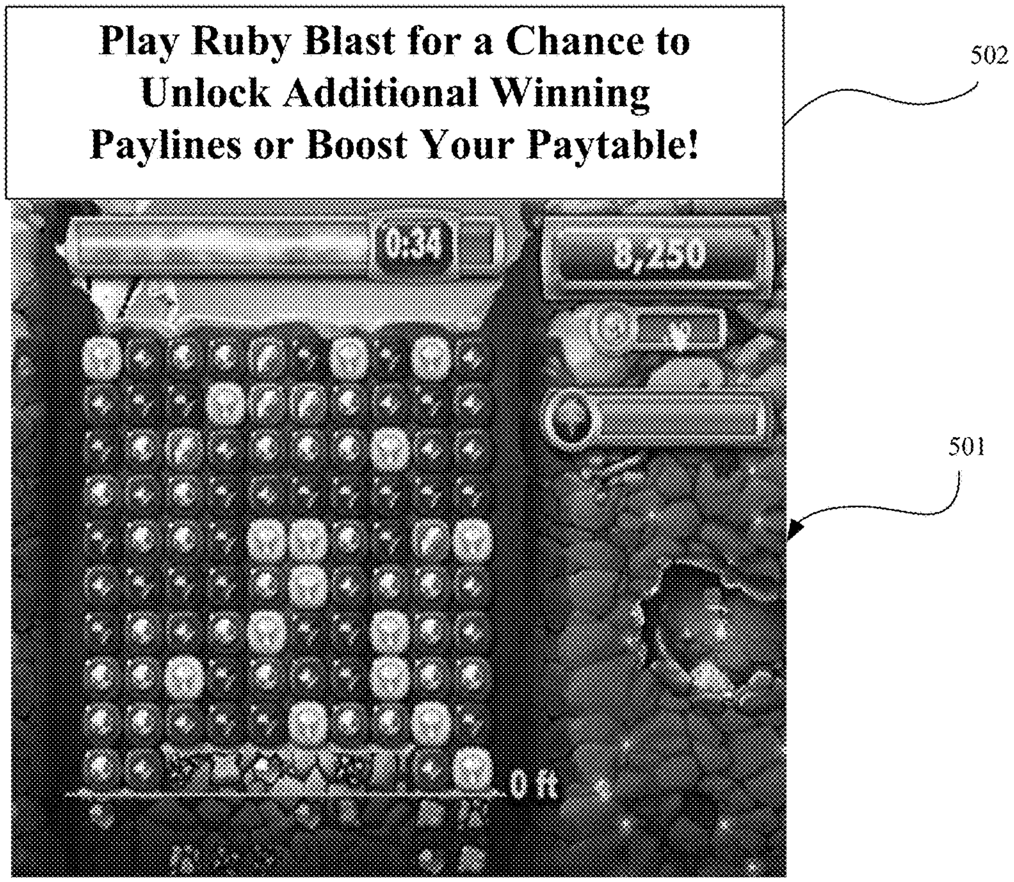
FIGS. 5A and 5B are GUI views for minigames, in an example embodiment.
Figure 5B:
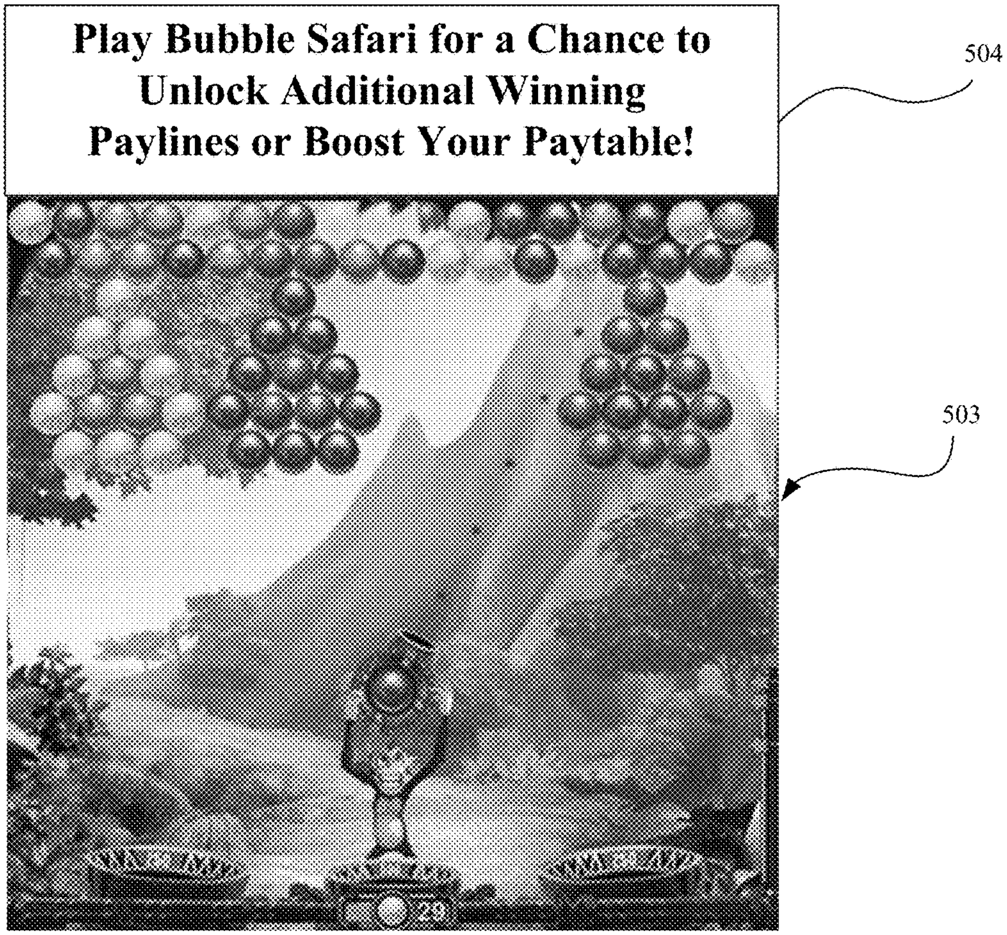

FIGS. 5A and 5B are GUI views for minigames, in an example embodiment. FIG. 5A depicts a GUI view 501 for a minigame called "Ruby Blast", by Zynga Inc., which runs on a mobile-device platform as described below. In an example embodiment of the game, a user matches three or more gems in a mine (e.g., using mouse clicks) during a time period in order to (a) dig deeper in the mine to recover artifacts for points and (b) achieve higher power levels. It will be appreciated that this minigame is a tile-matching game, specifically, a match-3 game. And it will further be appreciated that it is not a game of pure chance, since a user with a better strategy and better skill and/or speed at matching might achieve a higher point score and a higher power level. In an example embodiment, this minigame might include one or more of the social features discussed above. As depicted in this figure, GUI view 501 includes a text box 502 which states: "Play Ruby Blast for a Chance to Unlock Additional Winning Paylines or Boost Your Paytable!". As described above, a winning payline is a payline that results in a payout by a video slot machine. In another example embodiment, the text in the text box might serve as an inducement for the user to continue playing the online RMG game, using text similar to the following: ""Play Ruby Blast for a Chance to Unlock Additional Winning Paylines or Boost Your Paytable on Your Next Spin!".

FIG. 5B depicts a GUI view 503 for a minigame called "Bubble Safari", by Zynga Inc., which runs on a personal-computer platform and a mobile-device platform as described below. In an example embodiment of the game, a user aims and fires a gun (e.g., using mouse movements and mouse clicks) loaded with a colored bubble to match three or more colored bubbles in the air in order to (a) score points and (b) release food that allows the user to achieve higher power levels. It will be appreciated that this minigame is also a tile-matching game, specifically, a match-3 game. And it will further be appreciated that it is not a game of pure chance, since a user with a better strategy and better skill and/or speed at aiming and matching might achieve a higher point score and a higher power level. In an example embodiment, this minigame might also include one or more of the social features discussed above. As depicted in this figure, GUI view 503 includes a text box 504 which states: "Play Bubble Safari for a Chance to Unlock Additional Winning Paylines or Boost Your Paytable!". In another example embodiment, the text in the text box might serve as an inducement for the user to continue playing the online RMG game, using text similar to the following: ""Play Bubble Safari for a Chance to Unlock Additional Winning Paylines or Boost Your Paytable on Your Next Spin!".

Figure 6:
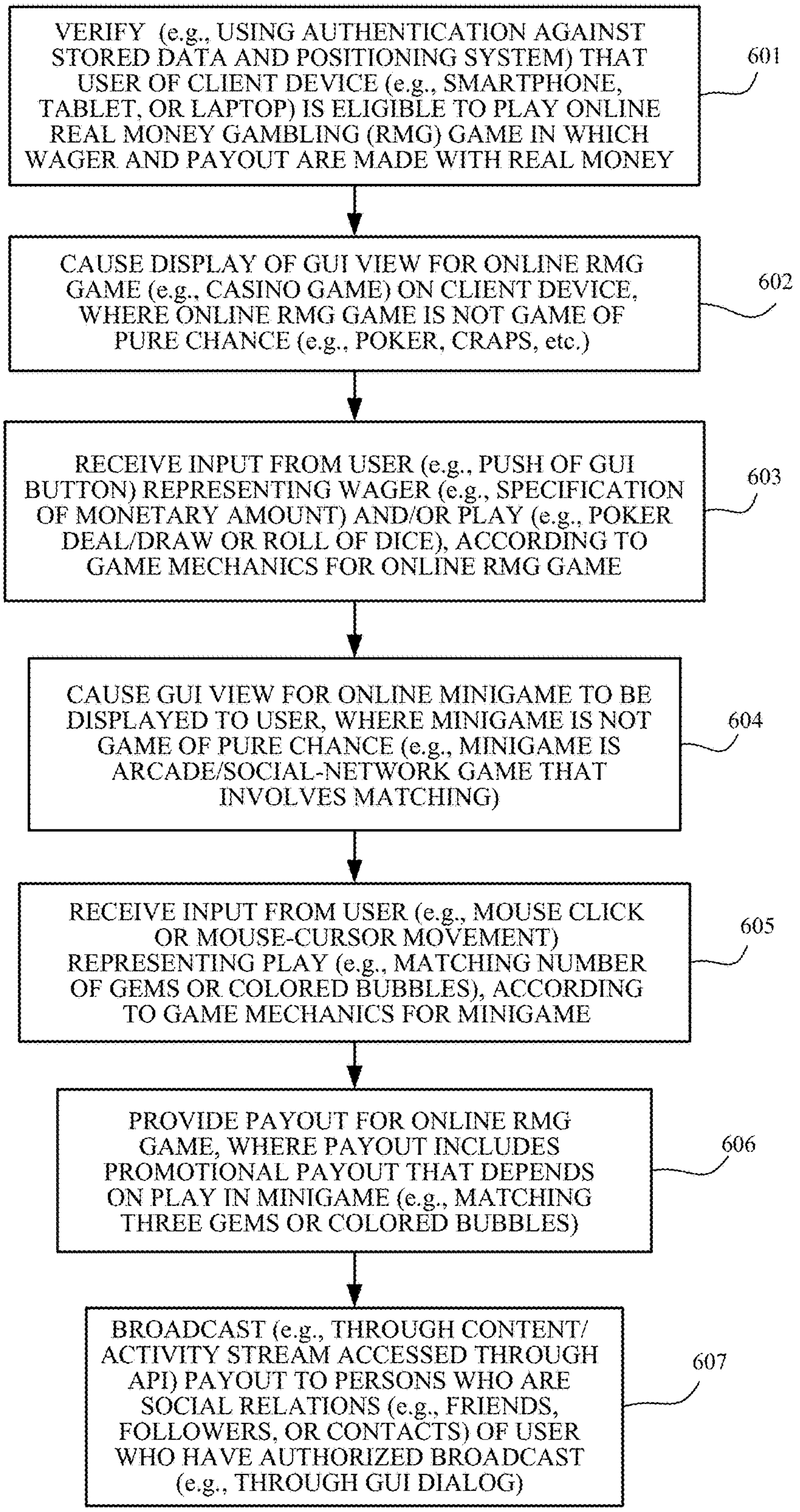
FIG. 6 is a flowchart diagram that illustrates another process for receiving a play and broadcasting a payout in an online RMG game that includes a minigame, in accordance with an example embodiment.

FIG. 6 is a flowchart diagram that illustrates another process for receiving a play and broadcasting a payout in an online RMG game that includes a minigame, in accordance with an example embodiment. In an example embodiment, one or more of the operations in this process might be performed by software (including software 203) running on servers at a website 103, e.g., a website, such as Zynga Inc., hosting an online RMG game. In the same or an alternative embodiment, one or more of the operations in these processes might be performed by software running on personal computing device 102, e.g., (a) instructions in a webpage read by a browser supporting Adobe Shockwave/ActionScript or HTML5/CSS3/JavaScript, or (b) instructions in an app (or in a hybrid app with embedded HTML5) executing on a smartphone. It will be appreciated that ActionScript and JavaScript might be used to implement animation and/or interactivity through a browser, in example embodiments.

Here again, the process described in FIG. 6 makes use of the social relations (e.g., friends, followers, contacts, etc.) of a user, according to a contact list, buddy list, social graph, or other control list. It will be appreciated that access to these social relations is controlled by the user. That is to say, the software performing the operations in FIG. 6 (and the other figures) will only have access to these social relations if the user authorizes such access, e.g., through a command entered on a GUI dialog displayed or caused to be displayed by the software. Similarly, in an example embodiment, the software performing the operations in FIG. 6 (and the other figures) might only have access to the profiles and/or content/activity streams of a social relation if authorized by the social relation, e.g., through a command entered on a GUI dialog displayed or caused to be displayed by software at website 103.

As depicted in FIG. 6, software (e.g., running on a server and/or client device) verifies that a user of a client device (e.g., smartphone, tablet, or laptop) is eligible to play an online RMG game in which the wager and the payout are made with real money, in operation 601. In an example embodiment, this operation, which might be performed in conjunction with authentication, includes verifying that the user is old enough to legally play (e.g., age twenty-one or older) using stored data relating to age (e.g., from a birth certificate, passport, driver's licenses, identification (ID) cards, social-security number, etc.) or data relating to age that might be obtained in real time or near real time (e.g., through a web or other API exposed by a governmental agency such as a federal state department or a state department of motor vehicles). Also, in an example embodiment, this operation might include verifying that a user's client device is located within the geographical boundaries of a governmental jurisdiction (e.g., within the state of Nevada or within the city of Atlantic City) using: (a) a global-positioning system (GPS); (b) a WiFi positioning system, which might include an indoor positioning system; (c) multilateration, e.g., using radio towers; (d) data such as "check-ins" retrieved from location-based social media; or (e) a combination (e.g., a hybrid system) of the foregoing. In an example embodiment, this operation might also include verification that the user meets non-governmental conditions relating to eligibility, e.g., that the user is not a problem gambler as determined by data in a user profile stored and maintained by website 103. For example, a user might be identified as a problem gambler if a recent credit report for the user is relatively bad and the user has lost a relatively large amount of money in a relatively short period of time.

In operation 602, the software causes the display of a GUI view for an online RMG game (e.g., casino game) on the client device. In an example embodiment, the online RMG game is not a game of pure chance. Examples of online casino games that are not games of pure chance include video versions of poker, craps, baccarat, pai gow, etc. In operation 603, the software receives input from the user (e.g., a push of GUI button) representing a wager (e.g., a specification of monetary amount) and/or a play (e.g., a spin of slot machine reels or a roulette wheel), according to the game mechanics for the online RMG game. In an example embodiment, one wager might be associated with several plays of the online RMG game. Or several wagers might be associated with one play of the online RMG game. Then the software causes a GUI view for a minigame (which might be online, offline, or a combination of the two) to be displayed to the user, in operation 604. For example, the GUI view for the minigame might be displayed following a wager but before receipt of a play in the online RMG game. Or the GUI view for the minigame might be displayed following receipt of play in the online RMG game, but before the determination (e.g., using an RNG) of whether the play results in a payout, according to a paytable for the online RMG game. The GUI view of the minigame might be displayed periodically after a specified number of wagers or plays in the online RMG game. For example, the GUI view of the minigame might be displayed after every other wager or play in the online RMG game or after every five wagers or after every five plays in the online RMG game. Alternatively, the GUI view of the minigame might be displayed after every wager or after every play in the online RMG game.

In an example embodiment, the minigame is also not game of pure chance. For example, the minigame might be a video version of an arcade game with social-networking features that involves matching (e.g., a tile-matching or match-3 game) such as Zynga's Ruby Blast or Zynga's Bubble Safari. In an example embodiment, the social-networking features might include allowing a user to invite social relations (e.g., friends, followers, or contacts) to assist with playing the game (e.g., completing a game task) or to join the game. They might also include broadcasting a user's points or other achievements (e.g., power levels) from the game to the content/activity streams of social relations who have authorized such broadcasts (e.g., through a GUI dialog).

In operation 605, the software receives input from the user (e.g., a mouse click or a mouse-cursor movement) representing a play (e.g., matching a number of gems or a number of colored bubbles), according to the game mechanics for the minigame. The software provides a payout for the online RMG game, in operation 606. Such a payout might occur following a new wager and/or a new play by the user in the online RMG game, in an example embodiment. As described above, a payout for an online RMG game might be determined by a paytable that is a schedule of payouts for the outcomes that might occur from wagers and plays in the online RMG game. In an example embodiment, the online RMG game might be video poker. A paytable for video poker might show the schedule of payouts for each winning hand, depending on the amount wagered.

In an example embodiment, the payout in operation 606 might include a promotional payout that depends on the play in minigame (e.g., matching three gems or matching three colored bubbles). The play might be a play received in operation 603. Or the play might be a new play by the user in the online RMG game. In an example embodiment, a promotional payout is a supplemental payout that is not reflected in the paytable for an online RMG game, e.g., a relatively small percentage such as approximately 1-20 percent of the paytable payout. Then in operation 607, the software broadcasts the payout to persons who are social relations (e.g., friends, followers, or contacts) of the user who have authorized the broadcast (e.g., through a GUI dialog). In an example embodiment, such broadcasting might be accomplished through the use of an application programming interface (API), which might be a web API, exposed by software running on a social networking/media website (e.g., website 106 in FIG. 1). Examples of such APIs include Facebook (REST) API, Facebook Graph API, Twitter API, Bebo's Social Networking API (SNAPI), OpenSocial API, etc. It will be appreciated that the Facebook APIs allow authorized third parties (e.g., third parties with an access token and/or permissions) to access a user's Facebook profile and the content/activity stream (e.g., Facebook News Feed) associated with that profile. Alternatively, the software might broadcast the payout to persons who are social relations using a messaging protocol such as email, instant messaging, SMS, etc. Here again, in some example embodiments, the software might not perform the broadcasting operation 607.

In the flowchart diagram shown in FIG. 3, the online RMG game is a casino game of pure chance. In flowchart diagram shown in FIG. 6, the online RMG game is a casino game that is not a game of pure chance. In both of the flowchart diagrams in FIGS. 3 and 6, the minigame is not a game of pure chance. These examples are meant as illustrative rather than limiting. In another example embodiment, both the online RMG game and the minigame might be games of pure chance (e.g., both the online RMG game and the minigame might be casino games). Or, the online RMG game might not be a game of pure chance and the minigame might be a game of pure chance (again, both the online RMG game and the minigame might be casino games).

Figure 7A:
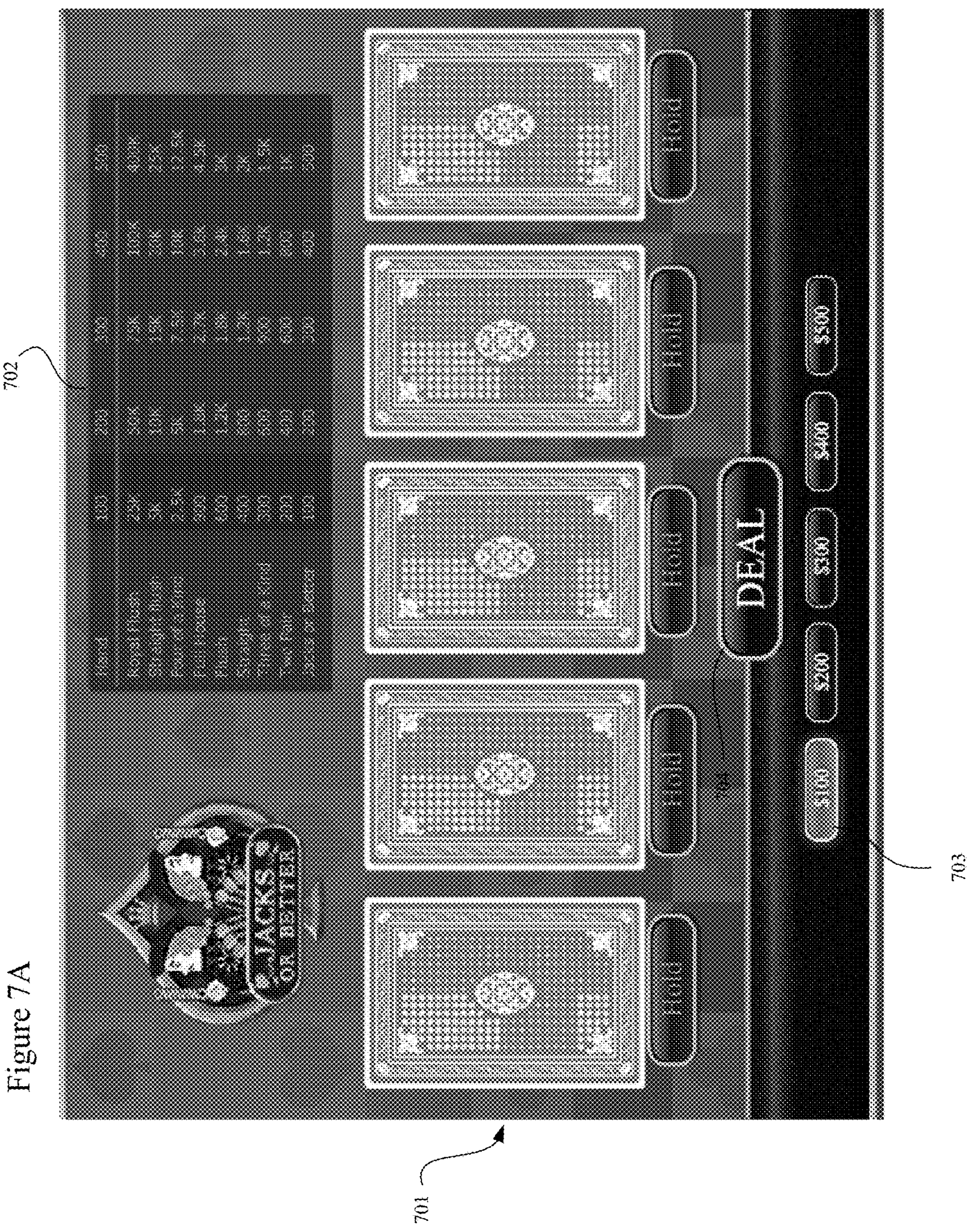
FIGS. 7A, 7B, and 7C are GUI views for a video poker game, in accordance with an example embodiment.
Figure 7B:
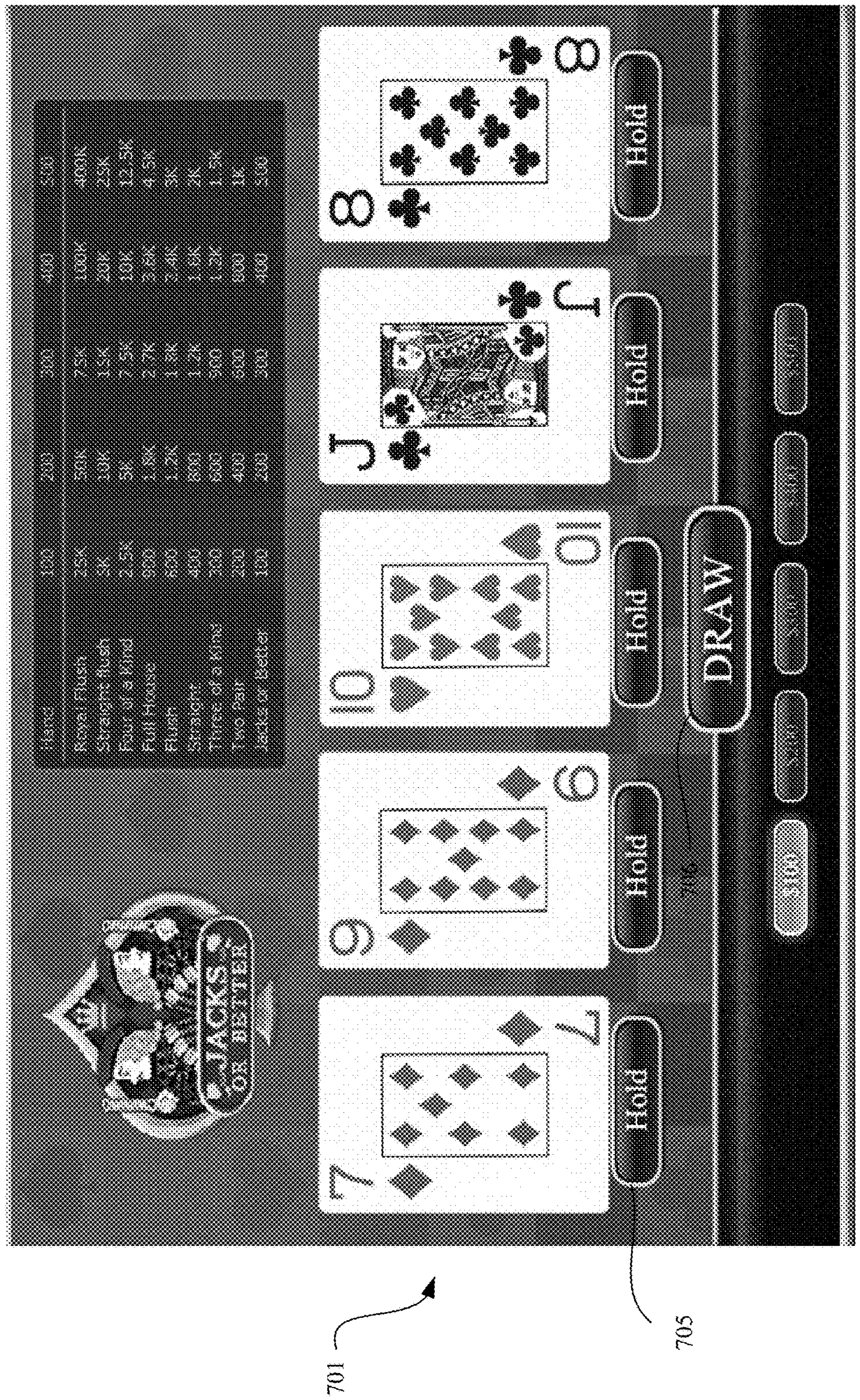
Figure 7C:

FIGS. 7A, 7B, and 7C are views in a graphical user interface (GUI) for a video poker game, in accordance with an example embodiment. As depicted in FIG. 7A, view 701 includes a hand of five face-down cards that have been dealt to a player, e.g., following a wager and play. As shown by the figure, the wager was $100, which the player specified by clicking on GUI button 703. Play was initiated by clicking on button 704, labeled "DEAL". View 701 also includes the paytable 702 for the video poker game, which shows the payout schedule for winning hands based on the monetary amount wagered. In FIG. 7B, the player has turned over the five cards in view 701 and now has an opportunity to draw a substitute card for each one of them. If the player wants to keep one of the existing cards, the player will click the GUI button labeled "Hold" below the card, such as GUI button 705. When the player clicks the GUI button 706 labeled "DRAW", the player will receive substitute cards for any cards not held. It will be appreciated that a video slot machine is a game of pure chance or nearly pure chance. It will be appreciated that video poker might be considered a game of strategy and/or skill, if a player is permitted to discard and draw cards. FIG. 7C shows the results of the player's decision to draw substitute cards for all five cards. As indicated by text box 707, the player has won a payout of $100 since the player's substitute cards included a pair of kings, which is better than a pair of jacks. The corresponding entry 708 in the paytable shows that the payout amount is the same monetary amount of the player's wager. To initiate another play with the same wager, the player will click again on the button 704.

Figure 8:
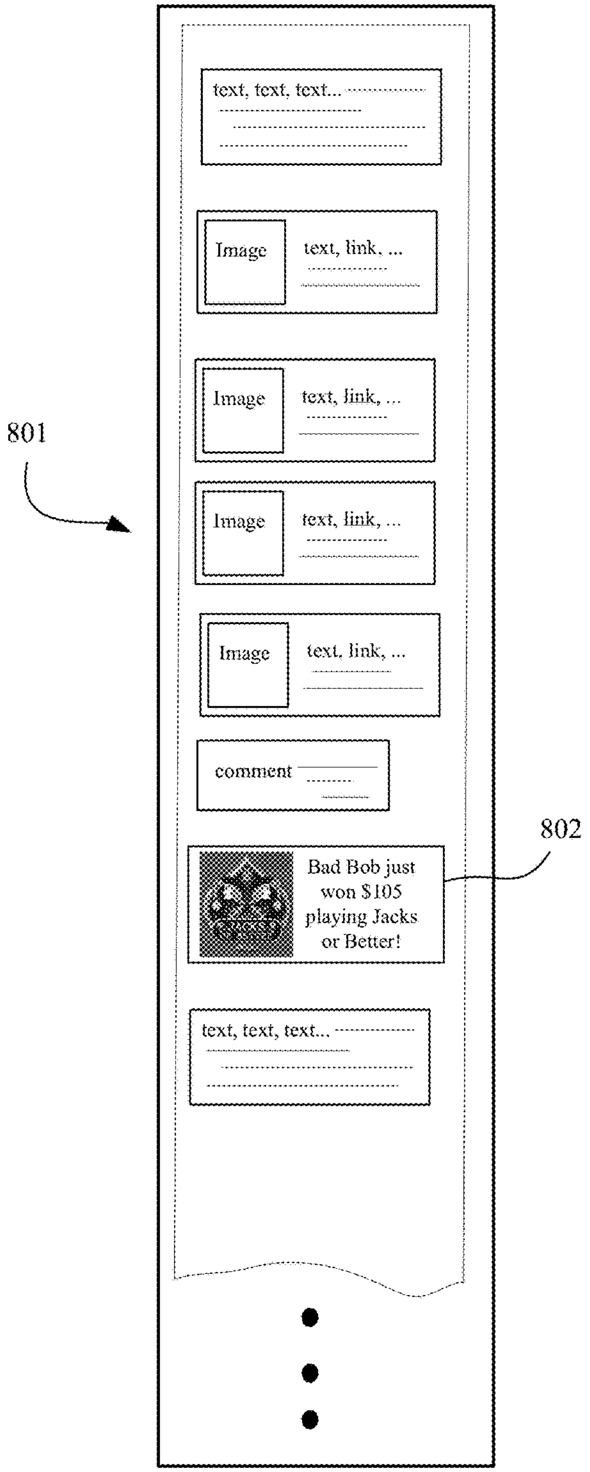
FIG. 8 is a template message broadcast to the content/activity stream, in accordance with an example embodiment.

FIG. 8 is a template message broadcast to a content/activity stream, in accordance with an example embodiment. In an example embodiment, the content/activity stream 801 might be associated with a profile of a social relation (e.g., friend, follower, or contacts) of a player of an online RMG game, e.g., the video poker game described in FIGS. 7A, 7B, and 7C. The content/activity stream and the profile might be maintained by a social networking/social media website accessed through an API by the online RMG website. Or the content/activity stream and the profile might be maintained by the online RMG website itself. In an example embodiment, the social relation might have previously authorized the broadcast, e.g., through a GUI dialog caused to be displayed by the online RMG website. As depicted in FIG. 8, the template message 802 broadcasts the payout of $105 awarded to "Bad Bob" as a result of playing the video poker game. It will be appreciated that such messages might stimulate interest in the video poker game, both among persons who are already playing the video poker game and persons who are not.

In an example embodiment, the content of template message 802 might vary depending on the age or other attributes of the social relation. For example, if the social relation is also a player of the online RMG game (e.g., a person who has been verified as eligible to play the online RMG game), the content of the message might be as shown in template message 802. But if the social relation is not a player of the online RMG game or is a person whose age has not been verified, the template message might say something like the following: "Bad Bob has played Jacks or Better (age-requirement 21)".

Figure 9:
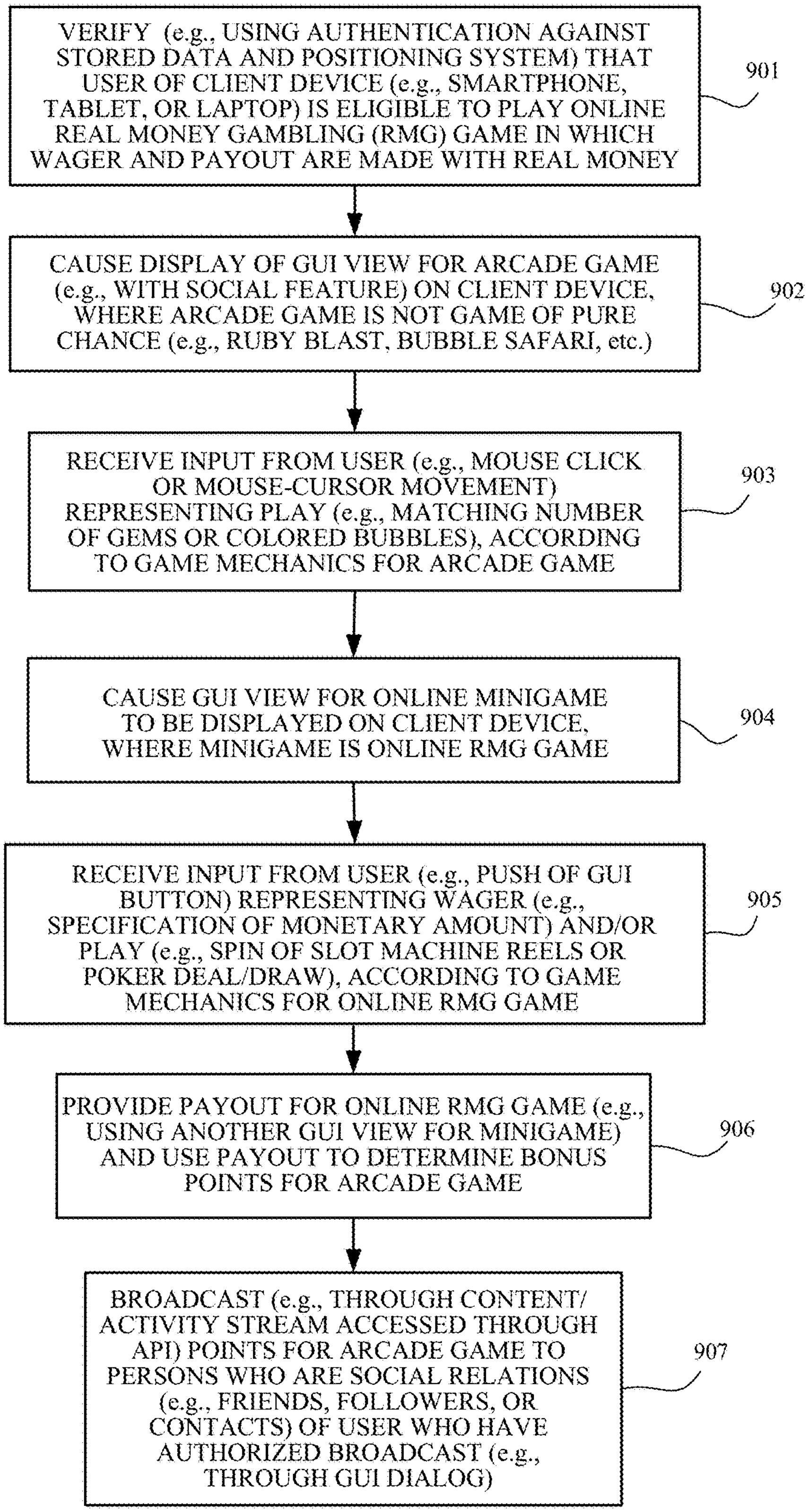
FIG. 9 is a flowchart diagram that illustrates a process for receiving a play and broadcasting points in an arcade game that includes a minigame which is an online RMG game, in accordance with an example embodiment.

FIG. 9 is a flowchart diagram that illustrates a process for receiving a play and broadcasting points in an arcade game that includes a minigame which is an online RMG game, in accordance with an example embodiment. In an example embodiment, one or more of the operations in this process might be performed by software (including software 203) running on servers at a website 103, e.g., a website, such as Zynga Inc., hosting an online RMG game. In the same or an alternative embodiment, one or more of the operations in these processes might be performed by software running on personal computing device 102, e.g., (a) instructions in a webpage read by a browser supporting Adobe Shockwave/ActionScript or HTML5/CSS3/JavaScript, or (b) instructions in an app (or in a hybrid app with embedded HTML5) executing on a smartphone. It will be appreciated that ActionScript and JavaScript might be used to implement animation and/or interactivity through a browser, in example embodiments.

Here again, the process described in FIG. 9 makes use of the social relations (e.g., friends, followers, contacts, etc.) of a user, according to a contact list, buddy list, social graph, or other control list. It will be appreciated that access to these social relations is controlled by the user. That is to say, the software performing the operations in FIG. 9 (and the other figures) will only have access to these social relations if the user authorizes such access, e.g., through a command entered on a GUI dialog displayed or caused to be displayed by the software. Similarly, in an example embodiment, the software performing the operations in FIG. 9 (and the other figures) might only have access to the profiles and/or content/activity streams of a social relation if authorized by the social relation, e.g., through a command entered on a GUI dialog displayed or caused to be displayed by software at website 103.

As depicted in FIG. 9, software (e.g., running on a server and/or client device) verifies that a user of a client device (e.g., smartphone, tablet, or laptop) is eligible to play an online RMG game in which wager and payout are made with real money, in operation 901. In an example embodiment, this operation, which might be performed in conjunction with authentication, includes verifying that the user is old enough to legally play (e.g., age twenty-one or older) using stored data relating to age (e.g., from a birth certificate, passport, driver's licenses, identification (ID) cards, social-security number, etc.) or data relating to age that might be obtained in real time or near real time (e.g., through a web or other API exposed by a governmental agency such as a state department or a department of motor vehicles). Also, in an example embodiment, this operation might include verifying that a user's client's is located within the geographical boundaries of a governmental jurisdiction (e.g., within the state of Nevada or within the city of Atlantic City) using a global-positioning system (GPS), a WiFi positioning system, which includes an indoor positioning system, multilateration, e.g., using radio towers, data such as "check-ins" retrieved from location-based social media; a combination (e.g., a hybrid system) of the foregoing, etc. In an example embodiment, this operation might also include verification that the user meets non-governmental conditions relating to eligibility, e.g., that the user is not a problem gambler, as determined by data in a user profile stored and maintained by website 103. For example, a user might be identified as a problem gambler if a recent credit report for the user is relatively bad and the user has lost a relatively large amount of money in a relatively short period of time.

In operation 902, the software causes a GUI view for an arcade game to be displayed on the client device. In an example embodiment, the arcade game is not a game of pure chance. For example, the arcade game might be a video version of an arcade game with social-networking features that involves matching (e.g., a tile-matching or match-3 game) such as Zynga's Ruby Blast or Zynga's Bubble Safari. In an example embodiment, the social-networking features might include allowing a user to invite social relations (e.g., friends, followers, or contacts) to assist with playing the game (e.g., completing a game task) or to join the game. They might also include broadcasting a user's points or other achievements (e.g., power levels) from the game to the content/activity streams of social relations who have authorized such broadcasts (e.g., through a GUI dialog).

In operation 903, the software receives input from the user (e.g., a mouse click or a mouse-cursor movement) representing a play (e.g., matching a number of gems or a number of colored bubbles), according to game mechanics for the arcade game. Then, in operation 904, the software causes a GUI view for an online minigame to be displayed on the client device, where the online minigame is an online RMG game (e.g., casino game). In operation 905, the software receives input from the user (e.g., a push of GUI button) representing a wager (e.g., a specification of monetary amount) and/or a play (e.g., a spin of slot machine reels or a poker deal/draw), according to the game mechanics for the online RMG game. Then the software provides a payout for the online RMG game (e.g., using another GUI view for the minigame) and uses the payout to determine bonus points for the arcade game, in operation 906. And in operation 907, the software broadcasts the points for the arcade game (including any bonus points) to persons who are social relations (e.g., friends, followers, or contacts) of the user who have authorized the broadcast (e.g., through a GUI dialog). In an example embodiment, such broadcasting might be accomplished through the use of an application programming interface (API), which might be a web API, exposed by software running on a social networking/media website (e.g., website 106 in FIG. 1). Examples of such APIs include Facebook (REST) API, Facebook Graph API, Twitter API, Bebo's Social Networking API (SNAPI), OpenSocial API, etc. It will be appreciated that the Facebook APIs allow authorized third parties (e.g., third parties with an access token and/or permissions) to access a user's Facebook profile and the content/activity stream (e.g., Facebook News Feed) associated with that profile. Alternatively, the software might broadcast the points for the arcade game (including any bonus points) to persons who are social relations using a messaging protocol such as email, instant messaging, SMS, etc. Here again, in some example embodiments, the software might not perform the broadcasting operation 907.

Figure 10A:
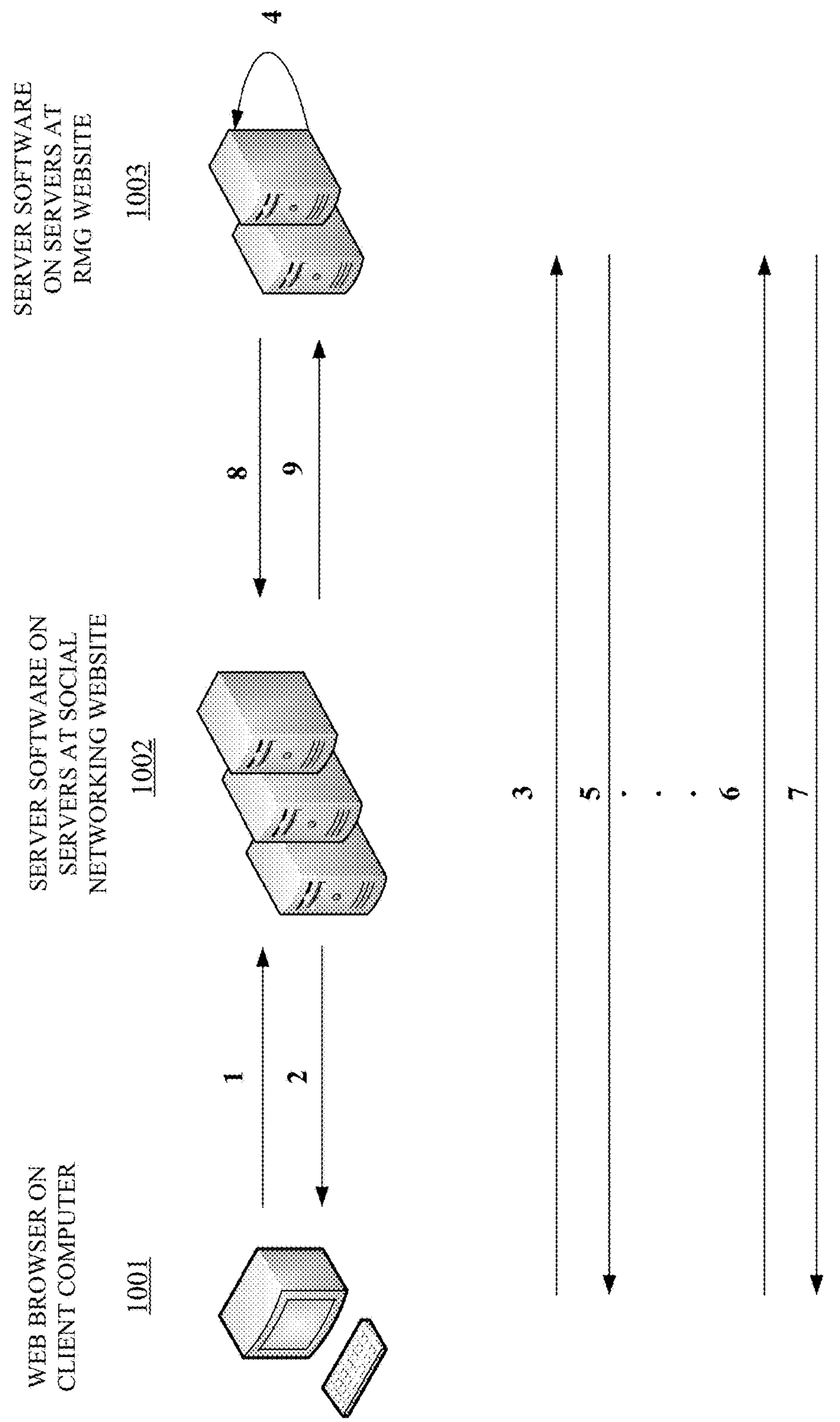
FIG. 10A is a sequence diagram that illustrates a sequence of transmissions associated with a broadcast of a payout in an online RMG game accessed from a social networking or social media website, in accordance with an example embodiment.

FIG. 10A is a sequence diagram that illustrates a sequence of transmissions associated with a broadcast of a payout in an online RMG game accessed from a social networking/ media website, in accordance with an example embodiment. As depicted in this diagram, a player has used a browser 1001 on a personal computing device to log onto a social networking website, e.g., server software 1002 (e.g., Facebook). However, many of the transmissions described in this figure and FIG. 10B might also occur if a player using a smartphone were to run a hybrid app written in Objective C or Java that includes embedded HTML5.

In operation 1, the player clicks on a graphic for the game, causing browser 1001 to transmit an HTTP request to server software 1002 (e.g., Facebook) for the game's initial web page. In operation 2, server software 1002 (e.g., Facebook) returns an HTML5, CSS3, and JavaScript (JS) web page consisting of an iFrame (e.g., Facebook "chrome") and an iFrame HTML tag for the game's initial web page. In operation 3, the browser uses the HTML tag to transmit a request to server software 1003 (e.g., Zynga) for the game's initial web page to display inside the iFrame. The game's initial web page might be an application server page (e.g., PHP 5) or an HTML5 page. In operation 4, the application server page executes on server software 1003 (e.g., Zynga), resulting in requests to databases and other servers as needed to complete generation of the web page, including possibly an HTTP request (not shown) transmitted to an API exposed by server software 1002 (e.g., Facebook). In operation 5, the server software 1003 (e.g. Zynga) returns the game's initial web page (e.g., HTML5, CSS3, and JS) for the browser to display in the iFrame.

At some point thereafter, in operation 6, the player clicks on a graphic (e.g., representing a graphical user interface or GUI widget) on a game web page (e.g., HTML5, CSS3, and JS), causing browser 1001 to transmit an HTTP request to server software 1003 (e.g., Zynga). The click might be a play in a minigame resulting in a payout (e.g., with a promotional payout determined by the play in a minigame) that is broadcast to the content/activity streams of social relations (e.g., friends, followers, or contacts) of the user who have authorized such broadcasts. In operation 7, the server software 1003 (e.g. Zynga) returns a web page (e.g., HTML5, CSS3, and JS) to the browser indicating that the request was received. In operation 8, the server software 1003 (e.g., Zynga) transmits an HTTP request to an API exposed by server software 1002 (e.g., Facebook), broadcasting the payout to the content/activity streams of the player's social relations on the social network managed by server software 1002 (e.g., Facebook). It will be appreciated that in order to access the social relations' content/activity streams (e.g., using an access token), the server software 1003 (e.g., Zynga) might have earlier obtained permission from the social relations, e.g., when they became players of the online RMG game or other online games at the online RMG website. Then in operation 9, server software 1002 (e.g., Facebook) sends a response, e.g., in Java Script Object Notation (JSON), to server software 1003 (e.g., Zynga) describing the success or failure of the broadcasting to each content/activity stream.

In an alternative example embodiment, the game's initial web page (or some subsequent web page served up by the game) might have an Adobe Flash application (e.g., a Small Web Format (SWF) file) embedded in it. In this alternative example embodiment, the user of browser 1001 might thereafter interact with the Adobe Flash application (e.g., its GUI), causing it to interact with the server software 1002 (e.g., Facebook) and the server software 1003 (e.g., Zynga).

Figure 10B:
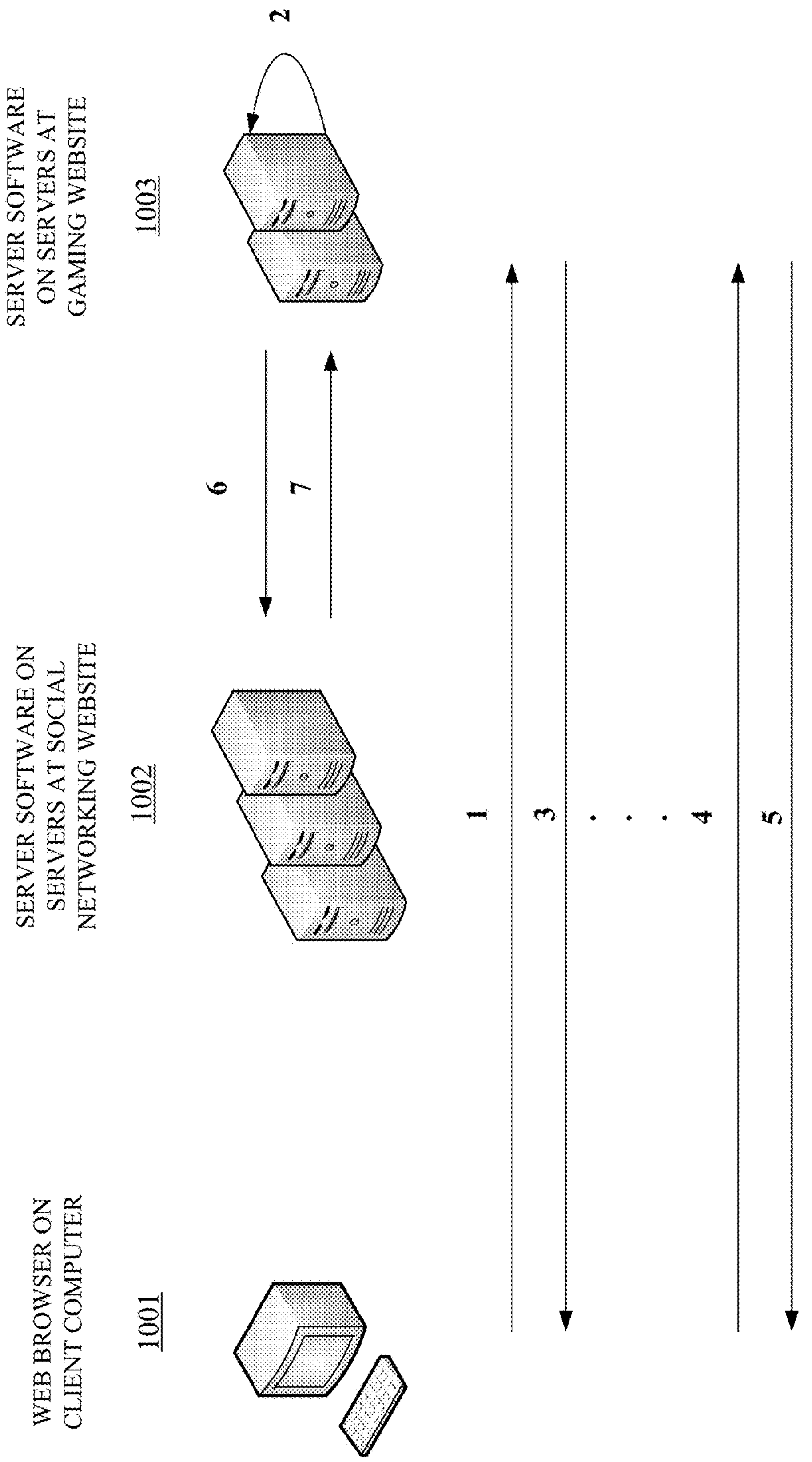
FIG. 10B is a sequence diagram that illustrates a sequence of transmissions associated with a broadcast of a payout in an online RMG game accessed from an online RMG website, in accordance with an example embodiment.

FIG. 10B is a sequence diagram that illustrates a sequence of transmissions associated with a broadcast of a payout in an online RMG game accessed from an online RMG website, in accordance with an example embodiment. In operation 1, the player clicks on a graphic for the game, causing browser 1001 to transmit an HTTP request to server software 1003 (e.g., Zynga) for the game's initial web page. The game's initial web page might be an application server page (e.g., PHP 5) or an HTML5 page. In operation 2, the application server page executes on server software 1003 (e.g., Zynga), resulting in requests to databases and other servers as needed to complete generation of the web page, including possibly an HTTP request (not shown) transmitted to an API exposed by server software 1002 (e.g., Facebook).

In operation 3, the server software 1003 (e.g. Zynga) returns the game's initial web page (e.g., HTML5, CSS3, and JS) for the browser to display.

At some point thereafter, in operation 4, the player clicks on a graphic (e.g., representing a GUI widget) on a game web page (e.g., HTML5, CSS3, and JS), causing browser 1001 to transmit an HTTP request to server software 1003 (e.g., Zynga). The click might be a play in a minigame resulting in a payout (e.g., with a promotional payout determined by the play in a minigame) that is broadcast to the content/activity streams of social relations (e.g., friends, followers, or contacts) of the user who have authorized such broadcasts. In operation 5, the server software 1003 (e.g. Zynga) returns a web page (e.g., HTML5, CSS3, and JS) to the browser indicating that the request was received. In operation 6, the server software 1003 (e.g., Zynga) transmits an HTTP request to an API exposed by server software 1002 (e.g., Facebook), broadcasting the payout to the content/activity streams of the player's social relations on the social network managed by server software 1002 (e.g., Facebook). It will be appreciated that in order to access the social relations' content/activity streams (e.g., using an access token), the server software 1003 (e.g., Zynga) might have earlier obtained permission from the social relations, e.g., when they joined other Zynga games. Then in operation 7, server software 1002 (e.g., Facebook) sends a response, e.g., in JSON, to server software 1003 (e.g., Zynga) describing the success or failure of the broadcasting to each content/activity stream.

Here again, in an alternative example embodiment, the game's initial web page (or some subsequent web page served by the game) might have an Adobe Flash application (e.g., a Small Web Format (SWF) file) embedded in it. In this alternative example embodiment, the user of browser 1001 might thereafter interact with the Adobe Flash application (e.g., its GUI), which, in turn, might interact with the server software 1002 (e.g., Facebook) and the server software 1003 (e.g., Zynga).

In terms of the hardware and software platforms involved in FIG. 1, the personal computing device 102 might be (a) a laptop or other personal computer or (b) a mobile device such as a smartphone, (e.g., an iPhone, Android, Blackberry, etc.) or a tablet computer (e.g., an iPad, Kindle, Nook, etc.). In an example embodiment, each of the websites 103, 106, and 108 might be composed of a number of servers connected by a network (e.g., a local area network (LAN) or a WAN) to each other in a cluster or other distributed system which might execute cloud-platform software, e.g., as described above. The servers in websites 103, 106, and 108 might also be connected to persistent storages 105, 107, and 109, respectively. In an example embodiment, persistent storages 105, 107, and 109 might comprise a storage area network (SAN) and/or might include a redundant array of independent disks (RAID).

Persistent storage 105 might be used to store algorithms and/or logic, including game mechanics, and data related to an RMG game and its players, including accounting data and data about the players received by website 103 from website 106 (e.g., through an application programming interface (API) exposed by website 106) or website 108 (e.g., through an application programming interface (API) exposed by website 108). In an example embodiment, some of the data from persistent storage 105 might be cached in memory cache 104*a* in volatile memory on servers on website 103 (e.g., using (a) an in-memory database or main memory database system (MMDB) or (b) a hybrid in-memory database that also uses persistent storage, in order to improve performance. Persistent storage 107 might be used to store data (including content) associated with a profile and/or content/activity stream for users of a social networking/social media website, e.g., users who are associated with each other through control lists as described above. In an example embodiment, persistent storage 105 might store similar data or content. Some of the data stored in persistent storage 107 might be cached in memory cache 104*b* in volatile memory on servers at website 106, in an example embodiment. Persistent storage 109 might be used to store governmental data (e.g., related to age) and/or auditing data (e.g., reports from and/or results from audits of websites such as website 103) and logic (e.g., logic that implements minimum internal control standards and/or technical or other standards).

As indicated above, personal computing device 102 might be a laptop or other personal computer. In that event, personal computing device 102 and the servers in website 103 and 106 might include (1) hardware consisting of one or more microprocessors and/or graphics processors (e.g., from the x86 family or the Power family), volatile storage (e.g., RAM), and persistent storage (e.g., a hard disk or flash memory), and (2) an operating system (e.g., Windows, Mac OS, Linux, Windows Server, Mac OS Server, etc.) that runs directly or indirectly (e.g., through virtualization software) on the hardware. Or the operating system might be replaced in whole or in part by a hypervisor or other virtualization software. Alternatively, personal computing device 102 might be a smartphone, tablet computer, or other mobile device that includes (1) hardware consisting of one or more low-power microprocessors and/or graphics processors (e.g., from the ARM family), volatile storage (e.g., RAM), and persistent storage (e.g., flash memory) and (2) an operating system (e.g., iOS, Android, Windows Phone, webOS, Linux, etc.) that runs on the hardware.

Also in an example embodiment, personal computing device 102 might include a web browser as an application program or part of an operating system. Examples of web browsers that might execute on personal computing device 102 if it is a laptop or other personal computer include, Internet Explorer, Mozilla Firefox, and Safari. Examples of browsers that might execute on personal computing device 102 if it is a smartphone, tablet computer, or other mobile device include Android Browser, Safari, Mozilla Firefox, and webOS Browser. It will be appreciated that users of personal computing device 102 might use browsers to communicate with software running on the servers at website 103 and at website 106. Alternatively, users of personal computing device 102 might use other application programs to communicate with software running on the servers at website 103 and at website 106. For example, if the personal computing device 102 is a smartphone, tablet computer, or other mobile device, users might use an app (e.g., an app written in Objective C or Java) or a hybrid app (e.g., an app written in Objective C or Java that includes embedded HTML5) to communicate with software running on the servers at website 103 and at website 106.

Though the disclosure above has focused on online RMG games, some or all of the operations described above might be used in a gamification application rather than in an online RMG game. It will be appreciated that gamification involves the use of game design techniques, game thinking, and game mechanics to enhance tasks performed in non-game contexts. So for example, some or all of the operations described above might be used in an employee training program.

With the above embodiments in mind, it should be understood that the inventions might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the inventions are useful machine operations. The inventions also relate to a device or an apparatus for performing these operations. The apparatus may be specially constructed for the required purposes, such as the carrier network discussed above, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The inventions can also be embodied as computer readable code on a computer readable medium. The computer readable medium is any data storage device that can store data, which can thereafter be read by a computer system. Examples of the computer readable medium include hard drives, network attached storage (NAS), read-only memory, random-access memory, CD-ROMs, CD-Rs, CD-RWs, DVDs, Flash, magnetic tapes, and other optical and non-optical data storage devices. The computer readable medium can also be distributed over a network coupled computer systems so that the computer readable code is stored and executed in a distributed fashion.

Although example embodiments of the inventions have been described in some detail for purposes of clarity of understanding, it will be apparent that certain changes and modifications can be practiced within the scope of the following claims. For example, some or all of the operations might be used with a client device that is not connected via a network to an online RMG website until some time after a wager and a play have been made by a player. Rather, a wager and a play might be stored on the client device and transmitted to an online RMG website at a later time, for collection of the wager and determination of any payout. Furthermore, the operations described above can be ordered, modularized, and/or distributed in any suitable way. Accordingly, the present embodiments are to be considered as illustrative and not restrictive, and the inventions are not to be limited to the details given herein, but may be modified within the scope and equivalents of the following claims. In the following claims, elements and/or steps do not imply any particular order of operation, unless explicitly stated in the claims or implicitly required by the disclosure.

What is claimed:

1. A method, comprising operations of:

verifying, at a server, a user as eligible to play an online game in which a wager and payout are made with real money, wherein the verifying includes determining that the user is old enough to legally play using data related to age obtained in real time or near real time through an application programming interface (API) exposed by a governmental agency and determining that the user is not a problem gambler based on information examined from a credit report of the user and information examined regarding losses by the user that occurred during a relatively short amount of time, wherein at least some of said information is in a stored user profile;

causing a graphical user interface (GUI) view for a first online game to be displayed to a client device of the user;

receiving, at the server, a first game input from the user, wherein the first game input represents a wager or a play according to game mechanics of the first online game;

causing a GUI view for a second game to be displayed to the user using a GUI widget;

receiving, at the server, a second game input from the user via the GUI view, wherein the second game input represents a play according to game mechanics for the second game, wherein the second game broadcasts game achievements by the user to an activity stream of a contact of the user on a social networking website through the use of an API exposed by software running on the social networking website, the second game input producing a result and then ending the GUI view of the second game;

responsive to generating the result for the second game, causing the GUI view for the first online game to return and providing a payout for the first online game to the user based on data read from and written to a memcache created by memcached and managed by software at the server, wherein the payout includes a promotional payout that depends at least in part on the result obtained from the GUI widget regarding the second game input.

2. The method of claim 1, wherein the first online game is a game of pure chance.

3. The method of claim 2, wherein the first online game is a casino game.

4. The method of claim 1, wherein the second game is not a game of pure chance.

5. The method of claim 4, wherein the second game is an arcade game.

6. The method of claim 5, wherein the arcade game allows the user to invite a social relation to assist with playing the arcade game.

7. The method of claim 1, wherein the governmental agency is a state department of motor vehicles.

8. Computer readable media that is not-transitory having program instructions for processing a first online game and a second game, comprising:

program instructions for verifying, at a server, a user as eligible to play an online game in which a wager and payout are made with real money, wherein the verifying includes determining that the user is old enough to legally play using data related to age obtained in real time or near real time through an application programming interface (API) exposed by a governmental agency and determining that the user is not a problem gambler based on information examined from a credit report of the user and information examined regarding losses by the user that occurred during a relatively short amount of time, wherein at least some of said information is in a stored user profile;

program instructions for causing a graphical user interface (GUI) view for a first online game to be displayed to a client device of the user;

program instructions for receiving, at the server, a first game input from the user, wherein the first game input represents a wager or a play according to game mechanics of the first online game;

program instructions for causing a GUI view for a second game to be displayed to the user using a GUI widget;

program instructions for receiving, at the server, a second game input from the user via the GUI view, wherein the second game input represents a play according to game mechanics for the second game, wherein the second game broadcasts game achievements by the user to an activity stream of a contact of the user on a social networking website through the use of an API exposed by software running on the social networking website, the second game input producing a result and then ending the GUI view of the second game; and program instructions for, responsive to generating the result for the second game, causing the GUI view for the first online game to return and providing a payout for the first online game to the user based on data read from and written to a memcache created by memcached and managed by software at the server, wherein the payout includes a promotional payout that depends at least in part on the result obtained from the GUI widget regarding the second game input.

* * * * *